United States Patent
Nakajima et al.

(10) Patent No.: US 8,283,599 B2
(45) Date of Patent: Oct. 9, 2012

(54) WELDING METHOD FOR T-JOINT

(75) Inventors: Toru Nakajima, Tsuchiura (JP); Hikaru Yamamoto, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 487 days.

(21) Appl. No.: 12/664,064

(22) PCT Filed: Sep. 26, 2008

(86) PCT No.: PCT/JP2008/067989
§ 371 (c)(1),
(2), (4) Date: Dec. 11, 2009

(87) PCT Pub. No.: WO2009/048017
PCT Pub. Date: Apr. 16, 2009

(65) Prior Publication Data
US 2010/0176108 A1    Jul. 15, 2010

(30) Foreign Application Priority Data
Oct. 12, 2007   (JP) ................... 2007-266531

(51) Int. Cl.
*B23K 9/00* (2006.01)
*B23K 33/00* (2006.01)
*B23K 35/30* (2006.01)
*B23K 9/28* (2006.01)

(52) U.S. Cl. ................... 219/137 R; 219/137.2

(58) Field of Classification Search .......... None
See application file for complete search history.

(56) References Cited

U.S. PATENT DOCUMENTS

| 5,202,546 | A | 4/1993 | Nakayama et al. |
| 6,386,427 | B2 * | 5/2002 | Iwago et al. ................... 228/164 |
| 7,005,607 | B2 * | 2/2006 | Takatani et al. .......... 219/124.34 |

FOREIGN PATENT DOCUMENTS

| JP | 4-238670 A | | 8/1992 |
| JP | 05-177347 | * | 7/1993 |
| JP | 5-177347 A | | 7/1993 |
| JP | 6-23544 A | | 2/1994 |
| JP | 6-344136 A | | 12/1994 |
| JP | 2001-71141 A | | 3/2001 |

OTHER PUBLICATIONS

WIPO. English Translation of International Preliminary Report on Patentability Chapter I (IB/373). May 11, 2010. 5 pgs.*

* cited by examiner

*Primary Examiner* — Hoang-Quan Ho
(74) *Attorney, Agent, or Firm* — Mattingly & Malur, PC

(57) ABSTRACT

In a plate assembling step, a gap (5) is formed between a leading end portion (3A) of a groove (3) provided on an upright plate (2) and a lower plate (1). An arc is generated from a welding wire (7) toward a back surface (3C) side of the groove (3) through the gap (5), to form a satisfactory penetration bead (8) on the back surface (3C) side of the groove (3). Next, the welding wire (7), the lower plate (1), the groove (3) of the upright plate (2) and the penetration bead (8) are fused to form a first-layer welding bead (9), thereby firmly joining the lower plate (1) and the groove (3) of the upright plate (2). The first and second welding steps are performed continuously after performing the plate assembling step, to enhance workability at the time of welding the lower plate (1) and the upright plate (2).

7 Claims, 11 Drawing Sheets

US 8,283,599 B2

WELDING METHOD FOR T-JOINT

TECHNICAL FIELD

The present invention relates to a welding method for T-joint which is suitably used for welding a lower plate and an upright plate which are disposed in a T-shape.

BACKGROUND ART

A hollow structure which is used as a boom, an arm, or the like for making up a working mechanism of a hydraulic excavator is formed as a rigid box-shaped structure having a quadrangular cross-sectional shape by, for example, combining and welding two T-joints.

In this case, the T-joint is generally formed by performing fillet welding between a groove formed on a leading end side of an upright plate and the top surface of a lower plate in a state in which the upright plate is disposed on the top surface side of the lower plate in a T-shape.

Here, in forming the T-joint in the above-described manner, in a case where fillet welding is performed from one side (front surface side) in the thickness wise direction of the upright plate, the front surface side of the upright plate and the lower plate can be sufficiently welded. However, in the case where fillet welding is performed from the front surface side of the upright plate, unwelded portions can possibly remain between the back surface side of the upright plate and the lower plate, and therefore there is a drawback in that the strength of the T-joint disadvantageously declines.

In contrast, a welding method has been proposed in which a bead (penetration bead) is formed in advance on the top surface of the lower plate, while a groove is formed in advance on the front surface side of the upright plate, and then in a state in which the back surface of the upright plate is butted against the penetration bead of the lower plate, or in a state in which the upright plate is disposed in spaced-apart relation to the penetration bead, arc welding or the like is performed between the lower plate and the upright plate from the front surface side of the groove (e.g., Patent Literature 1: Japanese Patent Laid-Open No. H4-238670 A and Patent Literature 2: Japanese Patent Laid-Open No. H6-23544 A).

However, in accordance with the conventional welding method, in a preliminary step for the operation of disposing the upright plate to be welded on the top surface side of the lower plate, a penetration bead needs to be formed in advance on the top surface of the lower plate. Accordingly, in the welding method in accordance with the conventional art, a welding operation is performed in which a penetration bead is formed on the top surface of the lower plate (first welding step). Next, an operation of disposing the upright plate on the top surface side of the lower plate along this penetration bead is performed (plate assembling step). Further, after the plate assembling step, a welding operation is performed in which a welding bead is formed by fusing the penetration bead formed on the lower plate and the back surface side of the groove provided on the upright plate (second welding step).

In this case, the first welding step, the plate assembling step and the second welding step are generally performed in respectively different workplaces. For this reason, in the case where the first welding step, the plate assembling step and the second welding step are performed as in the prior art, it is necessary to move back and forth among different workplaces a number of times, so that there is a problem in that workability at the time of forming a T-joint disadvantageously declines.

Further, with the welding method in accordance with the conventional art, the shape of the welding bead formed in the second welding step is determined in correspondence with the position of the upright plate with respect to the penetration bead formed in advance on the lower plate. For this reason, in the plate assembling step, it is necessary to precisely effect the positioning of the upright plate with respect to the penetration bead formed in advance on the lower plate, and there is a problem in that the workability of this positioning operation has a tendency to deteriorate.

DISCLOSURE OF THE INVENTION

In view of the above-discussed problems with the conventional art, it is an object of the present invention to provide a welding method for T-joint which makes it possible to form a satisfactory penetration bead on the back surface side of the groove provided on the upright plate and enhance workability at the time of welding with the lower plate and the upright plate disposed in a T-shape.

(1) To overcome the above-described problems, the present invention is applied to a welding method for T-joint in which a lower plate and an upright plate disposed in a T-shape are welded.

The welding method in accordance with the invention comprises: a plate assembling step of assembling the upright plate to the lower plate in a T-shape in a state in which a gap is formed between a lower end portion of the upright plate and a top surface of the lower plate; a first welding step of generating an arc from a welding electrode disposed on a front surface of the upright plate in a state in which the lower plate and the upright plate are assembled in the T-shape in the plate assembling step, so as to form a penetration bead on the lower plate while fusing the welding electrode and the lower plate and causing the gap to remain between a back surface of the upright plate and the lower plate; and a second welding step of generating an arc from the welding electrode disposed on the front surface side of the upright plate after the first welding step, to form a welding bead by fusing the welding electrode, the lower plate, the lower end portion of the upright plate, and the penetration bead, thereby joining the lower plate and the lower end portion of the upright plate.

According to this welding method, when the upright plate is disposed on the lower plate in the plate assembling step, a gap is formed between the lower end portion of the upright plate and the lower plate. In consequence, if, in the first welding step, an arc is generated from the welding electrode disposed on the front surface side of the upright plate, this arc is led to the back surface side of the upright plate through the gap between the lower end portion of the upright plate and the lower plate. For this reason, it is possible to form a penetration bead on the top surface side of the lower plate on the back surface side of the upright plate by fusing the welding electrode and the lower plate. Then, in the second welding step, a welding bead is formed by fusing the welding electrode, the lower plate, the lower end portion of the upright plate and the penetration bead, thereby making it possible to join the lower plate and the lower end portion of the upright plate.

In this case, the gap remains between the lower end portion of the upright plate and the penetration bead formed on the lower plate in the first welding step. For this reason, the arc generated from the welding electrode in the second welding step is reliably led to the back surface side of the upright plate through the gap between the penetration bead and the lower end portion of the upright plate. In consequence, the penetration bead and the lower end portion of the upright plate can be sufficiently fused, and a welding bead having a large leg length can be formed between the back surface side of the upright plate and the lower plate, so that it is possible to firmly join the lower plate and the lower end portion of the upright plate.

Further, after performing the plate assembling step, it is possible to continuously perform the first welding step and the second welding step. Accordingly, the plate assembling step, the first welding step and the second welding step can be performed efficiently in one workplace. Consequently, it is possible to enhance workability at the time of welding the lower plate and the upright plate as compared with the case of the conventional art in which the first welding step, the plate assembling step and the second welding step are performed in respectively different workplaces.

Moreover, the penetration bead formed on the lower plate in the first welding step is formed along the gap between the lower plate and the lower end portion of the upright plate disposed on that lower plate. For this reason, for example, the operation in which after forming the penetration bead on the lower plate, the upright plate is positioned with respect to this penetration bead can be made unnecessary, so that it is possible to further enhance workability at the time of welding the lower plate and the upright plate.

(2) In this case, according to the invention, in addition to the invention according to item (1) above, there is provided a third welding step of generating, after the second welding step, an arc from the welding electrode toward a first-layer welding bead formed in the second welding step, so as to form a second-layer welding bead in addition to the first-layer welding bead by fusing the welding electrode, the first-layer welding bead, the lower plate, and the lower end portion of the upright plate.

According to this welding method, after the first-layer welding bead having a large leg length is formed between the back surface side of the upright plate and the lower plate in the second welding step, a second-layer welding bead having a large leg length can be formed between the front surface side of the upright plate and the lower plate in the third welding step. Therefore, welding beads having large leg lengths can be respectively formed between the back surface side of the upright plate and the lower plate and between the front surface side of the upright plate and the lower plate, thereby making it possible to more firmly join the lower plate and the upright plate disposed in the T-shape.

(3) According to the invention, a consumable electrode is used as the welding electrode, and a dimension of the gap is set to be larger than an outside diameter of the consumable electrode.

In consequence, the arc generated from the consumable electrode is led from the tip of the consumable electrode to the back surface side of the upright plate through the gap between the lower end portion of the upright plate and the lower plate while undergoing gradual expansion in diameter in the radial direction. At this time, since the dimension of the gap is larger than the outside diameter of the consumable electrode, the lower end portion of the upright plate is suppressed from becoming fused by the arc in the first welding step, thereby making it possible to form a satisfactory penetration bead with respect to the lower plate located on the back surface side of the upright plate.

(4) According to the invention, a groove is formed on the lower end portion of the upright plate, and in the first welding step the welding electrode is arranged to generate the arc in a vicinity of a position of a point of intersection between an imaginary line suspended from a leading end portion of the groove and the lower plate.

In consequence, in the first welding step, the welding electrode can generate an arc in the vicinity of the position of a point of intersection between an imaginary line suspended from the leading end portion of the groove and the lower plate. For this reason, an arc is not generated on the front surface side of the groove, so that it is possible to form a satisfactory penetration bead on the back surface side of the groove.

(5) According to the invention, the lower end portion of the upright plate is a flat surface having a flat bottom surface, and in the first welding step the welding electrode is arranged to generate the arc in a vicinity of a position of a point of intersection between an imaginary line suspended from the back surface of the upright plate and the lower plate in a state in which the flat surface is opposed to the lower plate.

In consequence, in the first welding step, an arc can be generated from the welding electrode to the vicinity of the position of a point of intersection between an imaginary line suspended from the back surface of the upright plate whose lower end portion is a flat surface and the lower plate. Consequently, an arc is not generated on the front surface side of the upright plate, so that it is possible to form a satisfactory penetration bead on the back surface side of the upright plate by this arc.

Further, as the lower end portion of the upright plate is formed as the flat surface, it is possible to omit the step of forming a groove on the upright plate, so that it is possible to reduce the manufacturing cost of the T-joint by this portion.

(6) According to the invention, in the second welding step, the welding electrode is arranged to generate the arc in a same direction as a generating direction of the arc in the first welding step.

In consequence, in the second welding step, the welding electrode can generate the arc in a same direction as the generating direction of the arc in the first welding step, i.e., from the front surface side of the upright plate to the back surface side of the upright plate through the gap. Accordingly, the three members including the penetration bead, the lower plate and the lower end portion of the upright plate can be reliably fused by this arc.

(7) According to the invention, a mixed gas containing argon gas is used as a shielding gas for covering the arc.

Thus, by using a mixed gas containing argon gas as the shielding gas, a penetration bead having a smooth shape of its bead toe can be formed between the back surface of the upright plate and the lower plate in the first welding step. In consequence, it is possible to prevent concentration of a stress on the bead toe of the penetration bead, thereby making it possible to enhance the joining strength between the lower plate and the upright plate.

DESCRIPTION OF REFERENCE NUMERALS

Figure 1:
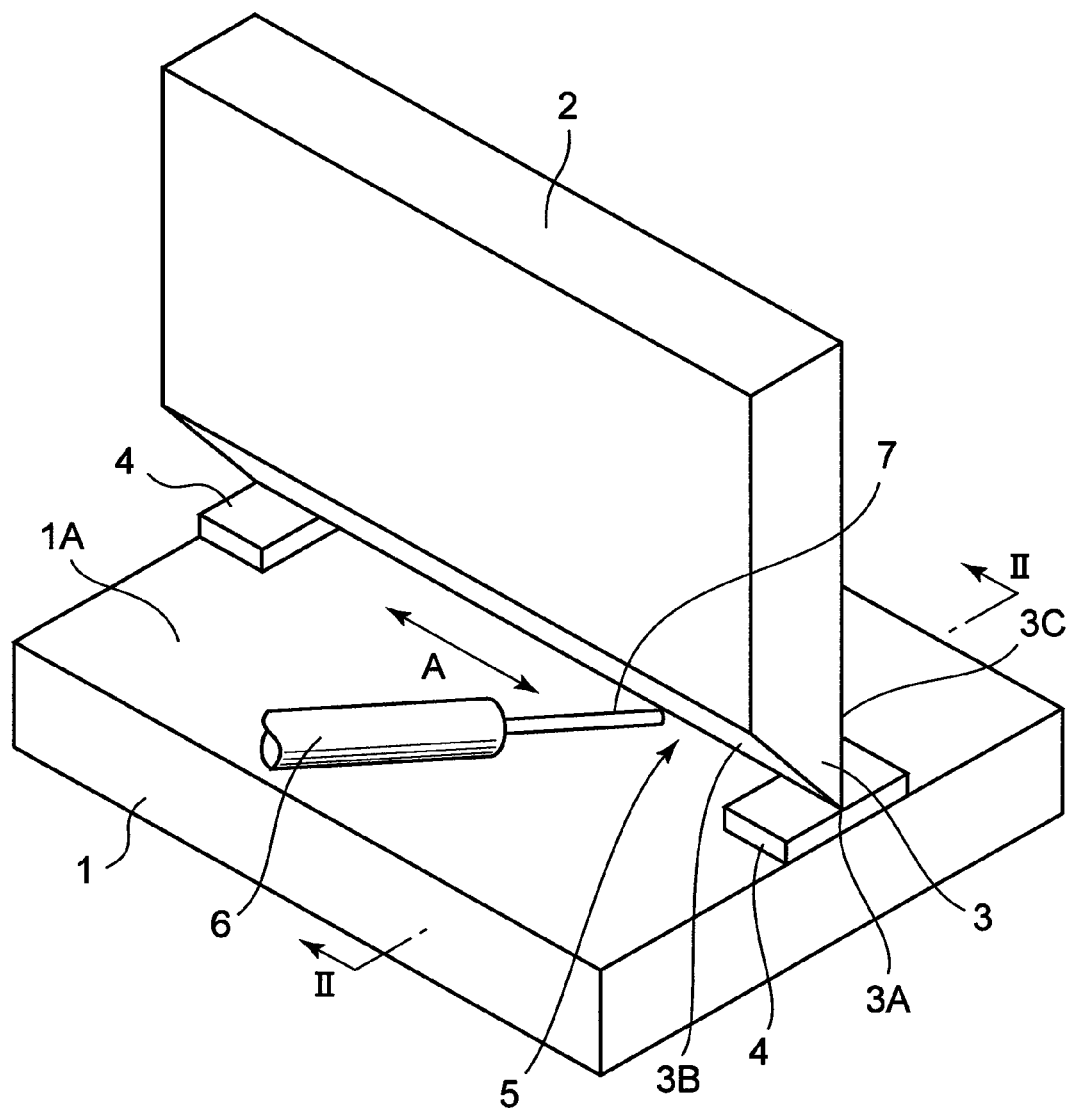
FIG. 1 is a perspective view illustrating a lower plate, an upright plate, a welding wire, and the like which are used in the welding method for T-joint in accordance with a first embodiment of the invention.

1: Lower plate
1A: Top surface
2, 11: Upright plate
3: Groove
3A: Leading end portion
3B, 11A: Front surface
3C, 11B: Back surface
5, 13, 27: Gap
6: Welding torch
7: Welding wire (welding electrode, consumable electrode)
8, 14: Penetration bead
9, 15: First-layer welding bead
10, 16: Second-layer welding bead
11C: Flat surface
22, 23: Flange plate (lower plate)
24, 25: Web plate (upright plate)
28, 29, 30, 31: Welding bead

BEST MODE FOR CARRYING OUT THE INVENTION

Hereafter, referring to the accompanying drawings, a detailed description will be given of the embodiments of the welding method for T-joint in accordance with the invention.

First, FIGS. 1 to 5 show a first embodiment of the invention, and this embodiment illustrates by way of example a case in which a groove is provided at a lower end portion of an upright plate.

In the drawings, indicated at 1 is a lower plate for making up a T-joint, and the lower plate 1 is formed into the shape of a flat plate by using such as a steel plate, for example. Further, the lower plate 1 is placed on a surface plate (not shown), and an upright plate 2, which will be described hereinafter, is adapted to be assembled to a top surface 1A side of the lower plate 1.

Indicated at 2 is the upright plate for making up the T-joint together with the lower plate 1, and the upright plate 2 is formed into the shape of a flat plate by using such as a steel plate, for example. Further, the upright plate 2 is assembled in a T-shape to the top surface 1A side of the lower plate 1 in a state of being substantially perpendicular to the lower plate 1.

In addition, a single-bevel groove 3 (hereafter referred to as the groove 3) which is inclined diagonally is formed at the lower end portion of the upright plate 2 (the front surface side of the lower plate 1), and this groove 3 and the lower plate 1 are adapted to be welded.

Figure 2:
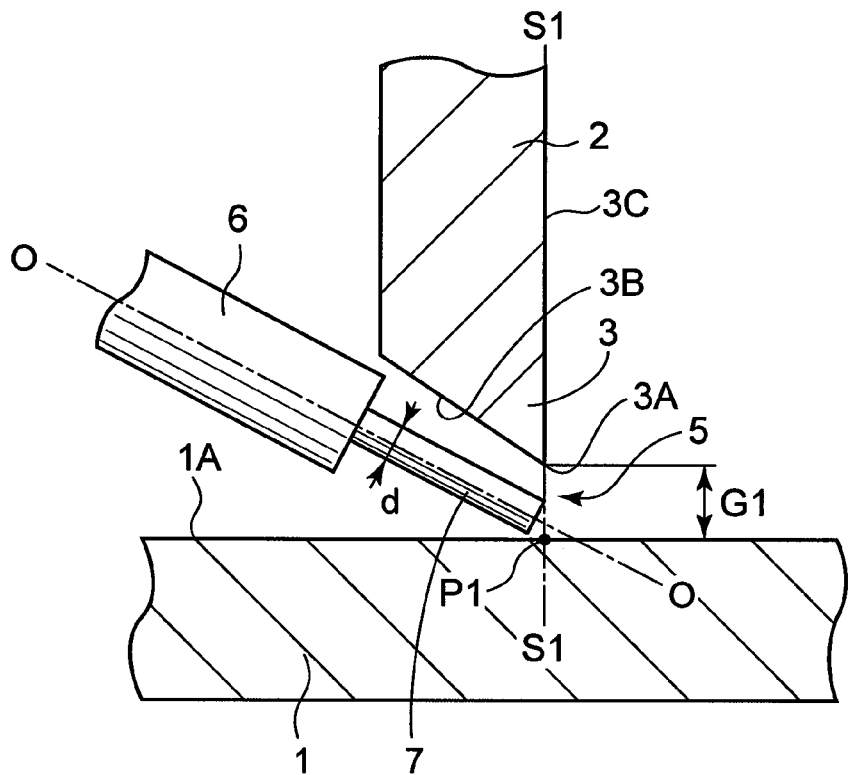
FIG. 2 is a cross-sectional view, taken from the direction of arrows II-II in FIG. 1, of a plate assembling step.

Further, as shown in FIG. 1, the upright plate 2 is assembled to the top surface 1A of the lower plate 1 in a T-shape through a pair of thin plate-shaped spacers 4. Further, as shown in FIG. 2, a gap 5 is formed between a leading end portion 3A of the groove 3 provided on the upright plate 2 and the top surface 1A of the lower plate 1. In addition, a welding wire 7, which will be described hereinafter, is adapted to be disposed on a front surface 3B side of the groove 3.

Here, a dimension G1 of the gap 5 formed between the leading end portion 3A of the groove 3 and the top surface 1A of the lower plate 1 is set to be larger than a diameter d of the welding wire 7. In consequence, when an arc is generated from a tip of the welding wire 7, this arc is adapted to be led to a back surface 3C side of the groove 3 through the gap 5.

Denoted at 6 is a welding torch for arc welding, and the welding torch 6 continuously feeds the welding wire 7 toward a welding portion between the groove 3 of the upright plate 2 and the lower plate 1. In addition, the welding torch 6 supplies a welding current from a power supply unit (not shown) for arc welding to the welding wire 7. Further, the arrangement provided is such that the welding torch 6 moves in the longitudinal direction of the upright plate 2 (in a direction indicated by arrows A in FIG. 1) while continuously feeding the welding wire 7 toward the welding portion between the groove 3 of the upright plate 2 and the lower plate 1.

Indicated at 7 is the welding wire serving as a welding electrode disposed on the front surface 3B side of the groove 3. This welding wire 7 is continuously fed toward the welding portion between the groove 3 of the upright plate 2 and the lower plate 1 by the welding torch 6. Here, as the welding current is supplied from the power supply unit (not shown), the welding wire 7 generates an arc toward the top surface 1A of the lower plate 1, as shown in FIG. 2. Further, the arrangement provided is such that as the welding wire 7 and the like are fused by the heat generated by this arc, it becomes possible to form a penetration bead 8 which will be described hereinafter.

In this case, the welding torch 6 supplies a shielding gas consisting of, for example, an argon-carbon dioxide mixed gas containing 80% of argon gas toward the welding portion between the groove 3 of the upright plate 2 and the lower plate 1. This shielding gas covers the arc generated from the welding wire 7 and the welding portion between the groove 3 and the lower plate 1 and shields them from the atmosphere. This makes it possible to suppress the generation of oxides and nitrides which cause welding defects.

Next, a description will be given of a method for forming a T-joint by welding the lower plate 1 and the groove 3 of the upright plate 2.

First, a description will be given of the plate assembling step. In this plate assembling step, as shown in FIGS. 1 and 2, the upright plate 2 is assembled to the top surface 1A side of the lower plate 1 in a T-shape through the spacers 4. In consequence, the upright plate 2 is disposed on the lower plate 1 in a state in which the gap 5 is formed between the leading end portion 3A of the groove 3 and the top surface 1A of the lower plate 1. In this case, the upright plate 2 is held in this position by using an assembling jig and the like (not shown).

Next, a description will be given of the first welding step. In this first welding step, the welding torch 6 and the welding wire 7 which is fed by this welding torch 6 are disposed on the front surface 3B side of the groove 3 provided on the upright plate 2. Here, as shown in FIG. 2, the dimension G1 of the vertical gap 5 formed between the leading end portion 3A of the groove 3 and the top surface 1A of the lower plate 1 is set to be larger than the diameter d of the welding wire 7.

In this case, if it is assumed that an imaginary line suspended from the leading end portion 3A of the groove 3 toward the lower plate 1 is S1-S1, and that a point of intersection between this imaginary line S1-S1 and the top surface 1A of the lower plate 1 is P1, the welding wire 7 is disposed at a position where its center line O-O intersects the top surface 1A of the lower plate 1 in the vicinity of the position of the point of intersection P1. In consequence, the welding wire 7 is adapted to generate an arc on the back surface 3C side of the groove 3 relative to the point of intersection P1 between the imaginary line S1-S1 and the top surface 1A of the lower plate 1, i.e., forwardly of the point of intersection P1.

In this state, a welding current is supplied from the power supply unit (not shown) for arc welding to the welding wire 7 while moving the welding torch 6 in the longitudinal direction of the upright plate 2 (in the direction indicated by arrows A in FIG. 1). In addition, a shielding gas consisting of a mixed gas containing, for example, argon gas is supplied from the welding torch 6 toward a welding portion between the groove 3 of the upright plate 2 and the lower plate 1.

Figure 3:
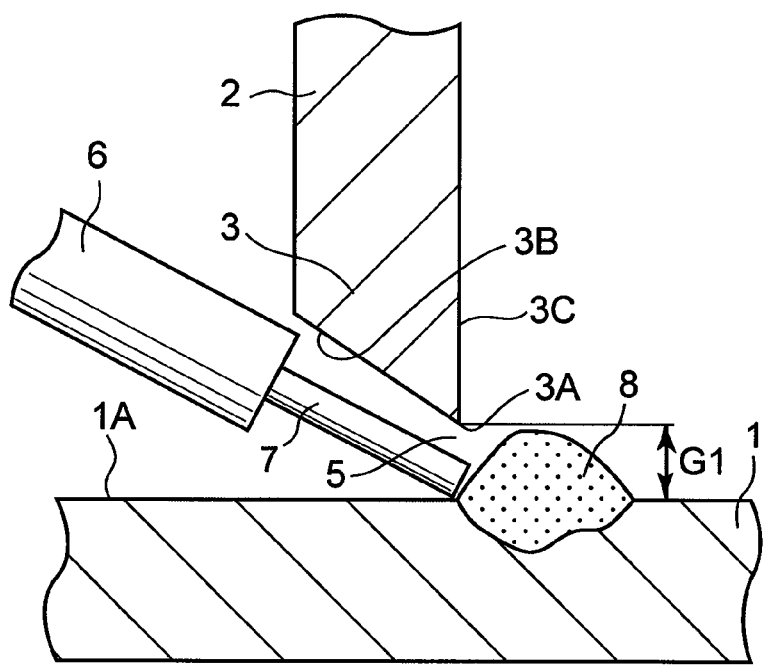
FIG. 3 is a cross-sectional view illustrating a first welding step at a position similar to that of FIG. 2.

In consequence, an arc is generated from the tip of the welding wire 7. Then, this arc is led to the back surface 3C side of the groove 3 on the top surface 1A of the lower plate 1 through the gap 5 between the leading end portion 3A of the groove 3 provided on the upright plate 2 and the lower plate 1. Thus, the arc is generated from the welding wire 7 disposed on the front surface 3B side of the groove 3 toward the back surface 3C side of the groove 3 on the lower plate 1. Further, as the welding wire 7 and the top surface 1A side of the lower plate 1 are fused by the heat generated by this arc, the penetration bead 8 is formed on the back surface 3C side of the groove 3, as shown in FIG. 3. This penetration bead 8 is continuously formed linearly along the longitudinal direction of the upright plate 2 with the gap 5 left between the bead and the groove 3 (upright plate 2).

In this case, the welding wire 7 generates the arc in the vicinity of the point of intersection P1 between the imaginary line S1-S1 suspended from the leading end portion 3A of the groove 3 and the lower plate 1. For this reason, the arc is not generated on the front surface 3B side of the groove 3, and the arc can be generated at that position of the top surface 1A of the lower plate 1 which is on the back surface 3C side of the groove 3. As a result, the penetration bead 8 can be reliably formed by the arc.

Further, the dimension G1 of the gap 5 formed between the leading end portion 3A of the groove 3 and the lower plate 1 is set to be larger than the diameter d of the welding wire 7. In this case, the arc generated from the welding wire 7 is led from the tip of the welding wire 7 to the back surface 3C side of the groove 3 through the gap 5 between the groove 3 and the lower plate 1 while undergoing gradual expansion in diameter in the radial direction. However, as the dimension G1 of the gap 5 is set to be larger than the diameter d of the welding wire 7, it is possible to suppress the leading end side of the groove 3 from becoming fused by the arc and form a satisfactory penetration bead 8 on the lower plate 1 located on the back surface 3C side of the groove 3.

In addition, a mixed gas containing argon gas is used as the shielding gas for covering the arc. In consequence, even in a case where the penetration bead 8 is formed by generating an arc from the welding wire 7 in a state in which the welding torch 6 is inclined diagonally with respect to the lower plate 1, as shown in FIG. 3, the bead toe of this penetration bead 8 can be formed into a smooth shape. Accordingly, it is possible to prevent a stress from becoming concentrated on the bead toe of the penetration bead by using, for example, carbon dioxide gas as the shielding gas.

Figure 4:
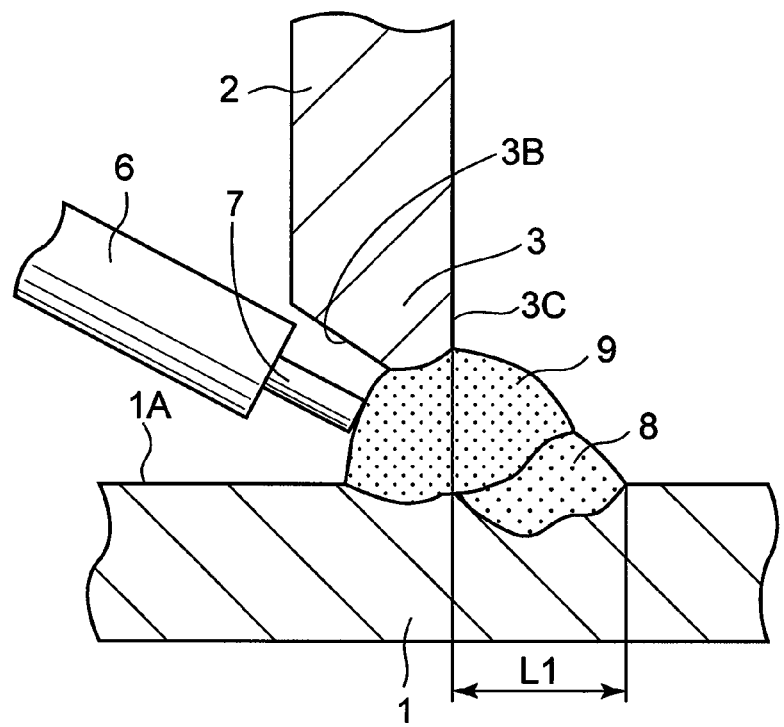
FIG. 4 is a cross-sectional view illustrating a second welding step at a position similar to that of FIG. 2.

Next, a description will be given of the second welding step. In this second welding step, after the penetration bead 8 is formed on the top surface 1A side of the lower plate 1 along the longitudinal direction of the upright plate 2, a welding current is supplied to the welding wire 7 while moving the welding torch 6 again in the longitudinal direction of the upright plate 2. In consequence, an arc is generated from the tip of the welding wire 7 toward the penetration bead 8 so as to fuse the welding wire 7, the top surface 1A side of the lower plate 1, the groove 3 of the upright plate 2, and the penetration bead 8. For this reason, a first-layer welding bead 9 is formed among the lower plate 1, the groove 3 and the penetration bead 8, as shown in FIG. 4, and the first-layer welding bead 9 is continuously formed linearly along the longitudinal direction of the upright plate 2.

In this case, the gap 5 remains between the leading end portion 3A of the groove 3 and the penetration bead 8 formed on the lower plate 1 in the first welding step, as shown in FIG. 3. For this reason, in the second welding step, the welding wire 7 generates the arc in the same direction as the generating direction of the arc in the first welding step, i.e., from the front surface 3B side of the groove 3 toward the back surface 3C side of the groove 3 through the gap 5. In consequence, the arc generated from the welding wire 7 can be reliably led to the back surface 3C side of the groove 3 through the gap 5. At this time, the penetration bead 8 formed on the back surface 3C side of the upright plate 2 on the top surface 1A of the lower plate 1 functions as a breakwater for the arc. Accordingly, the penetration bead 8, the lower plate 1 and the groove 3 of the upright plate 2 can be reliably fused by this arc.

At this time, the moving speed of the welding torch 6 in the second welding step is set to be smaller than the moving speed of the welding torch 6 in the first welding step. In consequence, the penetration bead 8, the leading end side of the groove 3, and the lower plate 1 can be sufficiently fused, and the first-layer welding bead 9 having a large leg length L1 can be formed between the back surface 3C of the groove 3 and the lower plate 1, as shown in FIG. 4. In consequence, it is possible to firmly join the lower plate 1 and the groove 3 of the upright plate 2.

Figure 5:
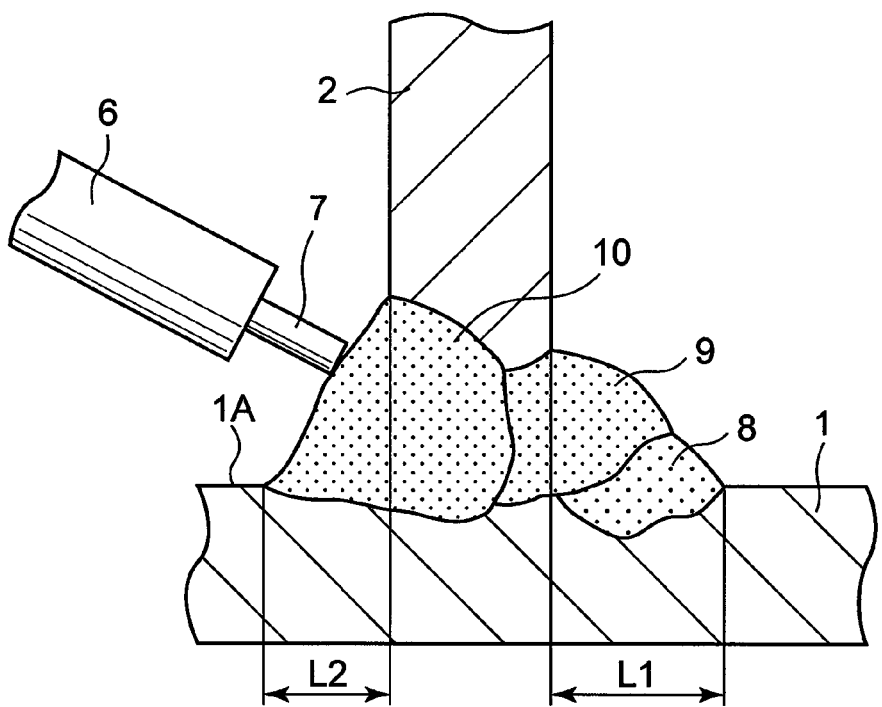
FIG. 5 is a cross-sectional view illustrating a third welding step at a position similar to that of FIG. 2.

Furthermore, a description will be given of a third welding step which is carried out after the second welding step. In this third welding step, after the first-layer welding bead 9 is formed among the penetration bead 8, the groove 3 and the lower plate 1, an arc is generated from the tip of the welding wire 7 toward the first-layer welding bead 9 while moving the welding torch 6 again in the longitudinal direction of the upright plate 2. Then, as the welding wire 7, the first-layer welding bead 9, the groove 3 of the upright plate 2, and the top surface 1A side of the lower plate 1 are fused by the heat generated by this arc, a second-layer welding bead 10 is formed among the first-layer welding bead 9, the groove 3 and the lower plate 1, as shown in FIG. 5. In this case, the second-layer welding bead 10 is continuously formed linearly along the longitudinal direction of the upright plate 2.

As described above, in the second welding step, the first-layer welding bead 9 having the large leg length L1 is formed on the back surface 3C side of the groove 3 between the groove 3 and the lower plate 1. Further, in the third welding step, the second-layer welding bead 10 having a large leg length L2 is formed on the front surface 3B side of the groove 3 among the first-layer welding bead 9, the groove 3 and the lower plate 1.

As a result, even in the case where one side welding is performed from the front surface 3B side of the groove 3 provided on the upright plate 2, the first-layer welding bead 9 having the large leg length L1 can be formed on the back surface 3C side of the groove 3, and the second-layer welding bead 10 having the large leg length L2 can be formed on the front surface 3B side of the groove 3. In consequence, it is possible to firmly join the lower plate 1 and the upright plate 2 which are disposed in the T-shape.

Thus, according to the first embodiment, in the plate assembling step, the gap 5 is formed between the leading end portion 3A of the groove 3 provided on the upright plate 2 and the lower plate 1. Next, in the first welding step, an arc is generated from the welding wire 7 disposed on the front surface 3B side of the groove 3 toward the back surface 3C side of the groove 3 through the gap 5 to thereby form the penetration bead 8 on the back surface 3C side of the groove 3. Further, by the second welding step following the first welding step, the first-layer welding bead 9 is formed by fusing the lower plate 1, the groove 3 of the upright plate 2, and the penetration bead 8.

For this reason, after performing the plate assembling step, it is possible to continuously perform the first welding step and the second welding step. Accordingly, the plate assembling step, the first welding step, and the second welding step can be performed efficiently in one workplace. For this reason, according to the first embodiment, it is possible to enhance workability at the time of welding the lower plate 1 and the upright plate 2 as compared with the case of the conventional art in which a welding operator moves back and forth among different workplaces a number of times to perform the first welding step for forming the penetration bead, the plate assembling step, and the second welding step in the respectively different workplaces.

The penetration bead 8 formed on the lower plate 1 in the first welding step is formed along the gap 5 between the lower plate 1 and the groove 3 of the upright plate 2 disposed on that lower plate 1. For this reason, as in the conventional art, the operation in which after forming the penetration bead 8 on the lower plate 1, the upright plate 2 is positioned with respect to this penetration bead 8 can be made unnecessary, so that it is possible to further enhance workability at the time of welding the lower plate 1 and the upright plate 2.

Thus, according to the first embodiment, after the first-layer welding bead 9 is formed among the penetration bead 8, the groove 3, and the lower plate 1 in the second welding step, the second-layer welding bead 10 is formed among the first-layer welding bead 9, the groove 3 and the lower plate 1 in the third welding step.

As a result, even in the case where one side welding is performed from the front surface 3B side of the groove 3 provided on the upright plate 2, the first-layer welding bead 9 having the large leg length L1 can be formed on the back surface 3C side of the groove 3, and the second-layer welding bead 10 having the large leg length L2 can be formed on the front surface 3B side of the groove 3. In consequence, the lower plate 1 and the upright plate 2 which are disposed in the T-shape can be joined more firmly by the welding beads 9 and 10 of the two layers.

In addition, the dimension G1 of the gap 5 between the groove 3 of the upright plate 2 and the lower plate 1 is set to be larger than the diameter d of the welding wire 7. In consequence, for example, even in the case where the arc generated from the welding wire 7 in the first welding step is led from the tip of the welding wire 7 to the back surface 3C side of the groove 3 through the gap 5 between the groove 3 and the lower plate 1 while undergoing gradual expansion in diameter in the radial direction, it is possible to suppress the leading end side of the groove 3 from becoming fused by the arc. As a result, it is possible to form a satisfactory penetration bead 8 on the back surface 3C side of the groove 3.

On the other hand, the welding wire 7 generates the arc in the vicinity of the point of intersection P1 between the imaginary line S1-S1 suspended from the leading end portion 3A of the groove 3 and the lower plate 1. For this reason, the arc is not generated on the front surface 3B side of the groove 3, and the arc can be generated on the back surface 3C side of the groove 3 and at the position of the top surface 1A of the lower plate 1. As a result, the penetration bead 8 can be reliably formed on the back surface 3C side of the groove 3 by the arc.

Furthermore, in the second welding step, the welding wire 7 generates the arc in the same direction as the generating direction of the arc in the first welding step, i.e., from the front surface 3B side of the groove 3 toward the back surface 3C side of the groove 3 through the gap 5. For this reason, the three members including the penetration bead 8, the lower plate 1, and the groove 3 of the upright plate 2 can be reliably fused by the arc, and it is possible to increase the joining strength between the lower plate 1 and the upright plate 2.

Next, FIGS. 6 to 10 show a second embodiment of the welding method for T-joint in accordance with the invention.

Here, the characteristic feature of this embodiment lies in that the lower end portion of the upright plate is formed into a flat surface having a flat bottom surface. In the following description of the second embodiment, those component parts which are identical with a counterpart in the above-described first embodiment are simply designated by the same reference numeral or character to avoid repetitions of similar explanations.

In the drawings, reference numeral 11 denotes an upright plate for making up a T-joint together with the lower plate 1, and the upright plate 11 is used in this embodiment in substitution of the upright plate 2. The upright plate 11 is formed into the shape of a flat plate by using such as a steel plate, for example, in substantially the same way as the upright plate 2. However, the upright plate 11 differs from the upright plate 2 in accordance with the first embodiment in that its lower end portion (the top surface side of the lower plate 1) is formed as a below-described flat surface 11C.

Figure 6:
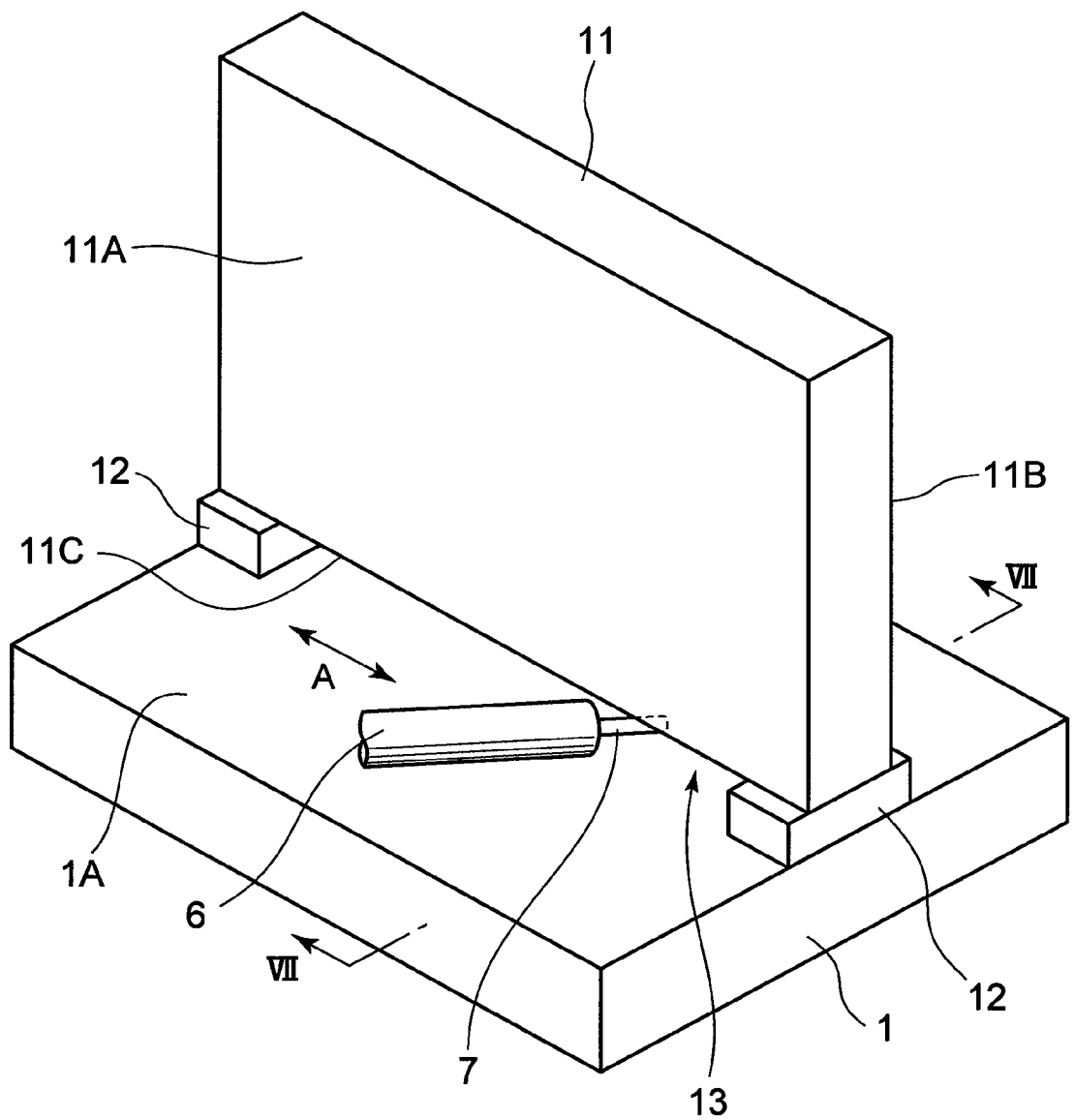
FIG. 6 is a perspective view illustrating the lower plate, the upright plate, the welding wire, and the like which are used in the welding method for T-joint in accordance with a second embodiment.

Here, the flat surface 11C provided on the lower end portion of the upright plate 11 is a cut surface at the time of cutting, for example, a steel plate, and is a flat surface having a flat bottom surface which is not provided with groove processing or the like. Further, as shown in FIG. 6, the upright plate 11 is assembled to the top surface 1A of the lower plate 1 in a T-shape through a pair of thin plate-shaped spacers 12. In consequence, a vertical gap 13 is formed between the flat surface 11C of the upright plate 11 and the top surface 1A of the lower plate 1.

At this time, a dimension G2 of the gap 13 between the flat surface 11C of the upright plate 11 and the top surface 1A of the lower plate 1 is set to be larger than the diameter d of the welding wire 7 which is fed from the welding torch 6 disposed on an front surface 11A side of the upright plate 11. For this reason, the welding wire 7 extends from the tip side of the welding torch 6 toward a back surface 11B of the upright plate 11 without coming into contact with the top surface 1A of the lower plate 1 and the flat surface 11C of the upright plate 11 (see FIG. 7).

In consequence, when an arc is generated from the tip of the welding wire 7, this arc is adapted to be led to the back surface 11B side of the upright plate 11 through the gap 13. In this case, if it is assumed that an imaginary line suspended from the back surface 11B of the upright plate 11 toward the lower plate 1 is S2-S2, and that a point of intersection between this imaginary line S2-S2 and the top surface 1A of the lower plate 1 is P2, the welding wire 7 is disposed at a position where its center line O-O intersects the top surface 1A of the lower plate 1 in the vicinity of the position of the point of intersection P2. In consequence, the welding wire 7 is adapted to generate an arc to the back surface 11B side of the upright plate 11 relative to the point of intersection P2 between the imaginary line S2-S2 and the top surface 1A of the lower plate 1.

Next, a description will be given of the method of forming a T-joint by welding the lower plate 1 and the flat surface 11C of the upright plate 11.

First, in the plate assembling step shown in FIG. 6, the upright plate 11 is assembled to the top surface 1A side of the upright plate 1 in a T-shape through the spacers 12. In consequence, the upright plate 11 is disposed on the lower plate 1 in the T-shape with the gap 13 formed between the flat surface 11C and the top surface 1A of the lower plate 1. Further, the upright plate 11 is held at this position by using an assembling jig and the like (not shown).

Figure 7:
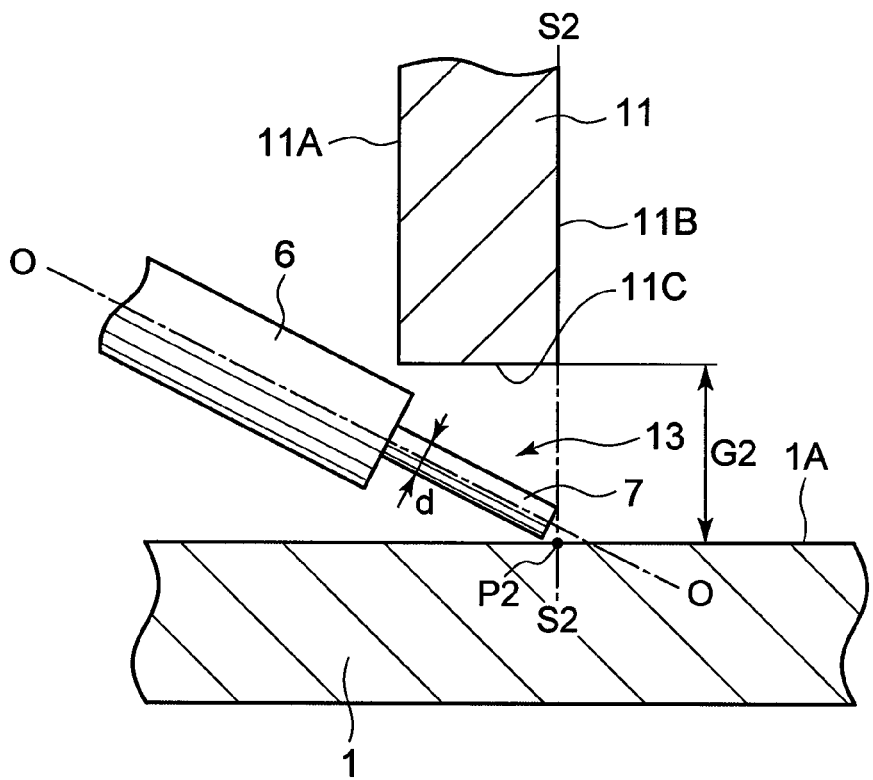
FIG. 7 is a cross-sectional view, taken from the direction of arrows VII-VII in FIG. 6, of the plate assembling step.
Figure 8:
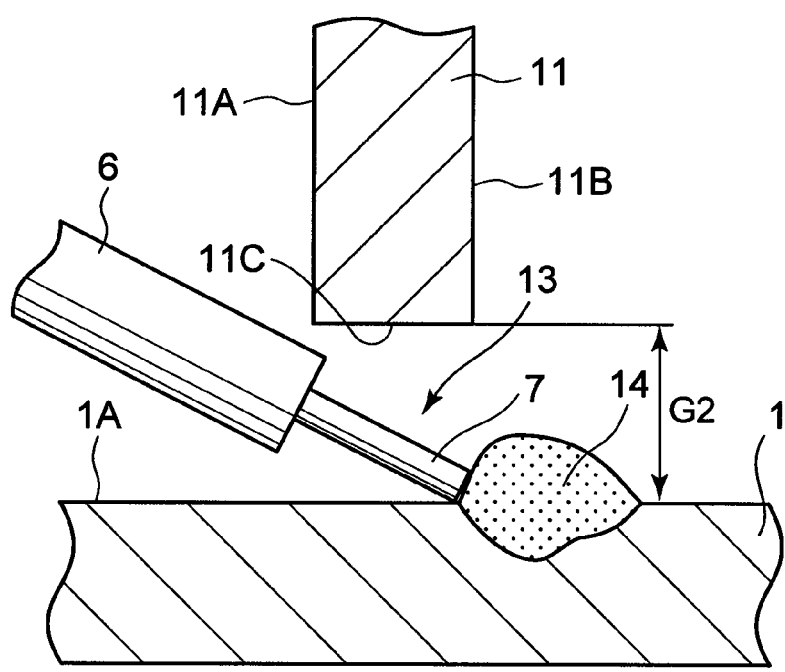
FIG. 8 is a cross-sectional view illustrating the first welding step at a position similar to that of FIG. 7.

Next, in the first welding step shown in FIGS. 7 and 8, the welding torch 6 and the welding wire 7 are disposed on the front surface 11A side of the upright plate 11. In this case, if it is assumed that the point of intersection between the imaginary line S2-S2 suspended from the back surface 11B of the upright plate 11 toward the lower plate 1 is P2, as shown in FIG. 7, the welding wire 7 is disposed at a position where its center line O-O intersects the top surface 1A of the lower plate 1 in the vicinity of the position of the point of intersection P2.

In this state, an arc is generated from the welding wire 7 while moving the welding torch 6 in the longitudinal direction of the upright plate 11 (in the direction indicated by arrows A in FIG. 6). In addition, a shielding gas consisting of a mixed gas containing, for example, argon gas is supplied from the welding torch 6 toward a welding portion between the flat surface 11C of the upright plate 11 and the lower plate 1.

In consequence, the arc generated from the welding wire 7 is led from the front surface 11A side of the upright plate 11 to the back surface 11B side through the gap 13 between the flat surface 11C of the upright plate 11 and the lower plate 1. Further, as the welding wire 7 and the top surface 1A side of the lower plate 1 are fused by this arc, a penetration bead 14 is formed on the back surface 11B side of the upright plate 11, as shown in FIG. 8. This penetration bead 14 is continuously formed linearly along the longitudinal direction of the upright plate 11 with the gap 13 left between the same and the flat surface 11C.

In this case, the welding wire 7 generates the arc in the vicinity of the point of intersection P2 between the imaginary line S2-S2 suspended from the back surface 11B of the upright plate 11 and the lower plate 1. For this reason, the arc is not generated on the front surface 11A side of the upright plate 11 or in the gap 13 between the upright plate 11 and the lower plate 1. In consequence, the arc can be generated on the back surface 11B side of the upright plate 11, thereby making it possible to reliably form the penetration bead 14.

Figure 9:
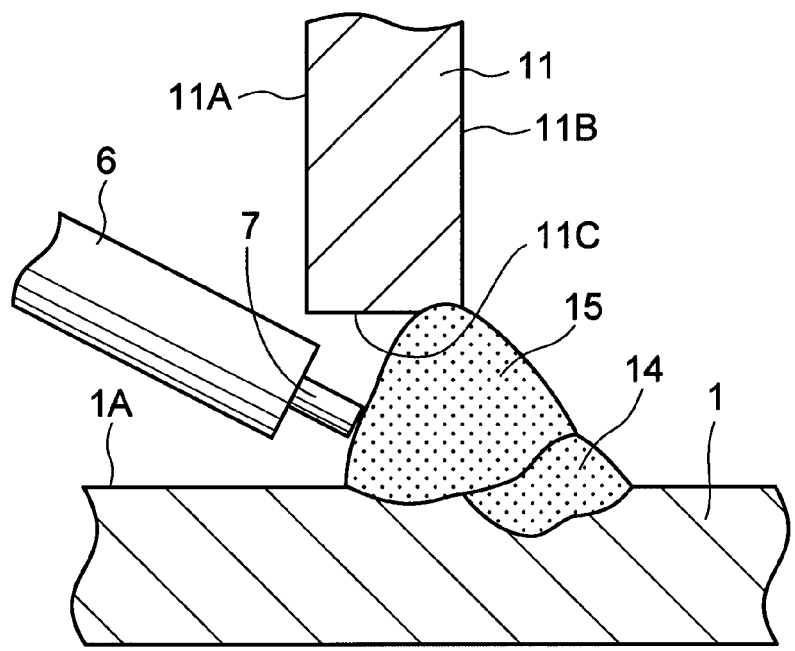
FIG. 9 is a cross-sectional view illustrating the second welding step at a position similar to that of FIG. 7.

Next, in the second welding step shown in FIG. 9, after forming the penetration bead 14 on the back surface 11B side of the upright plate 11, the welding torch 6 is moved again in the longitudinal direction of the upright plate 11. Then, an arc is generated from the tip of the welding wire 7 toward the penetration bead 14 to fuse the welding wire 7, the top surface 1A of the lower plate 1, the flat surface 11C of the upright plate 11, and the penetration bead 14. In consequence, a first-layer welding bead 15 can be formed among the lower plate 1, the upright plate 11, and the penetration bead 14 linearly continuously along the longitudinal direction of the upright plate 11.

In this case, the welding wire 7 generates the arc in the same direction as the generating direction of the arc in the first welding step, i.e., from the front surface 11A side of the upright plate 11 toward the back surface 11B side of the upright plate 11. At this time, the penetration bead 14 formed on the back surface 11B side of the upright plate 11 on the upper surface 1A of the lower plate 1 functions as a breakwater for the arc. Accordingly, it is possible to sufficiently fuse the flat surface 11C of the upright plate 11 where the groove is not formed, the lower plate 1, and the penetration bead 14. As a result, the gap 13 between the lower plate 1 and the flat surface 11C of the upright plate 11 can be blocked by the first-layer welding bead 15.

Figure 10:
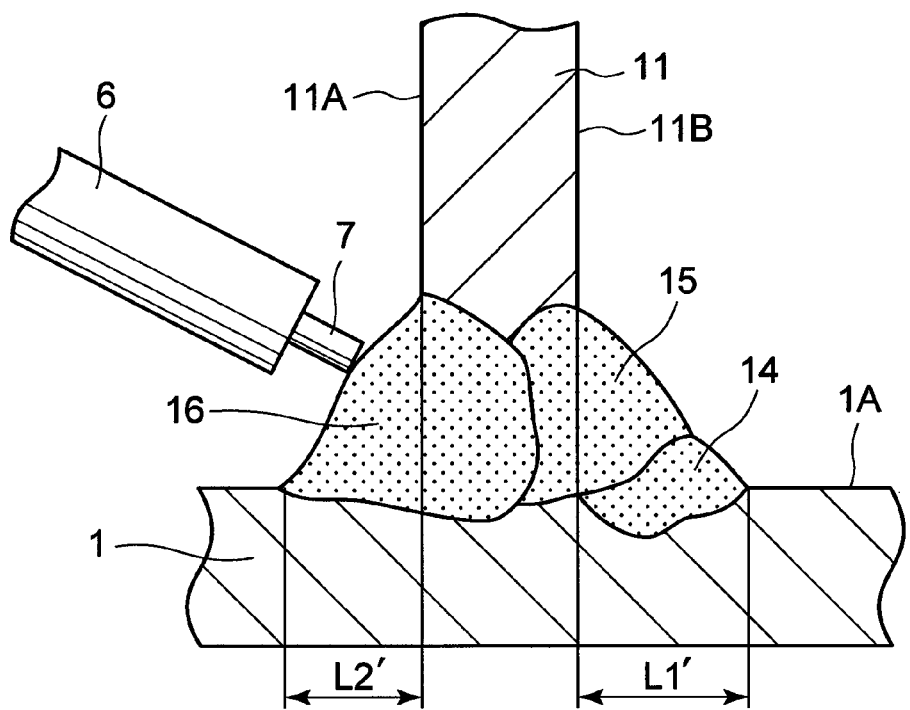
FIG. 10 is a cross-sectional view illustrating the third welding step at a position similar to that of FIG. 7.

Next, in the third welding step shown in FIG. 10, after the first-layer welding bead 15 is formed among the lower plate 1, the flat surface 11C of the upright plate 11, and the penetration bead 14, the welding torch 6 is moved again in the longitudinal direction of the upright plate 11. Then, an arc is generated from the tip of the welding wire 7 toward the first-layer welding bead 15.

In consequence, the welding wire 7, the first-layer welding bead 15, the flat surface 11C of the upright plate 11, and the top surface 1A of the lower plate 1 are fused. As a result, a second-layer welding bead 16 can be formed among the first-layer welding bead 15, the flat surface 11C, and the lower plate 1 linearly continuously along the longitudinal direction of the upright plate 11.

As described above, even in the case where one side welding is performed from the front surface 11A side of the upright plate 11 whose lower end portion is formed as the flat surface 11C not provided with groove processing, the first-layer welding bead 15 having a large leg length L1 can be formed on the back surface 11B side of the upright plate 11. In addition, the second-layer welding bead 16 having a large leg length L2 can be formed on the front surface 11A side of the upright plate 11. In consequence, it is possible to firmly join the lower plate 1 and the upright plate 11 which are disposed in the T-shape.

Moreover, according to the second embodiment, as the lower end portion of the upright plate 11 is formed as the flat surface 11C not provided with groove processing, it is possible to omit the step for forming a groove on the upright plate 11. As a result, it is possible to reduce the manufacturing cost of the T-joint.

Next, referring to FIGS. 11 to 15, a description will be given of a case where a hollow structure is formed by upper and lower flange plates serving as lower plates and left and right web plates serving as upright plates as an example of the welding method for T-joint in accordance with the invention.

Figure 11:
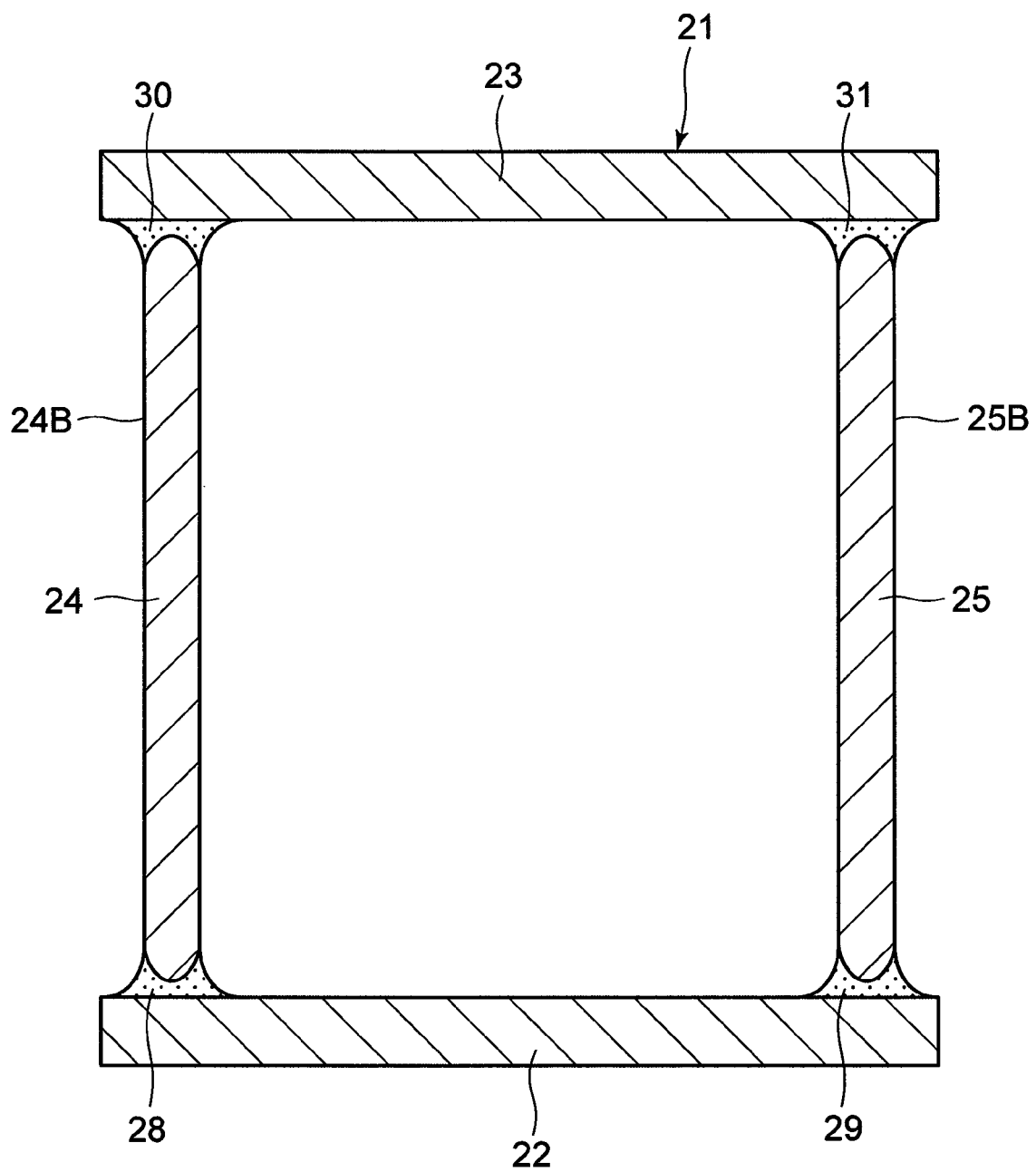
FIG. 11 is a cross-sectional view illustrating a hollow structure formed by using the welding method for T-joint in accordance with the invention.

First, indicated at 21 is a hollow structure formed by using the welding method for T-joint in accordance with the invention. This hollow structure 21 is used as, for example, a boom, an arm, or the like of a hydraulic excavator. Here, as shown in FIG. 11, the hollow structure 21 is formed as a rectangular tubular body having a closed cross-sectional structure by a lower flange plate 22 and an upper flange plate 23 which are vertically opposed to each other and by a left web plate 24 and a right web plate 25 which are disposed between the flange plates 22 and 23 in face-to-face relation to each other in the left-right direction.

Figure 12:
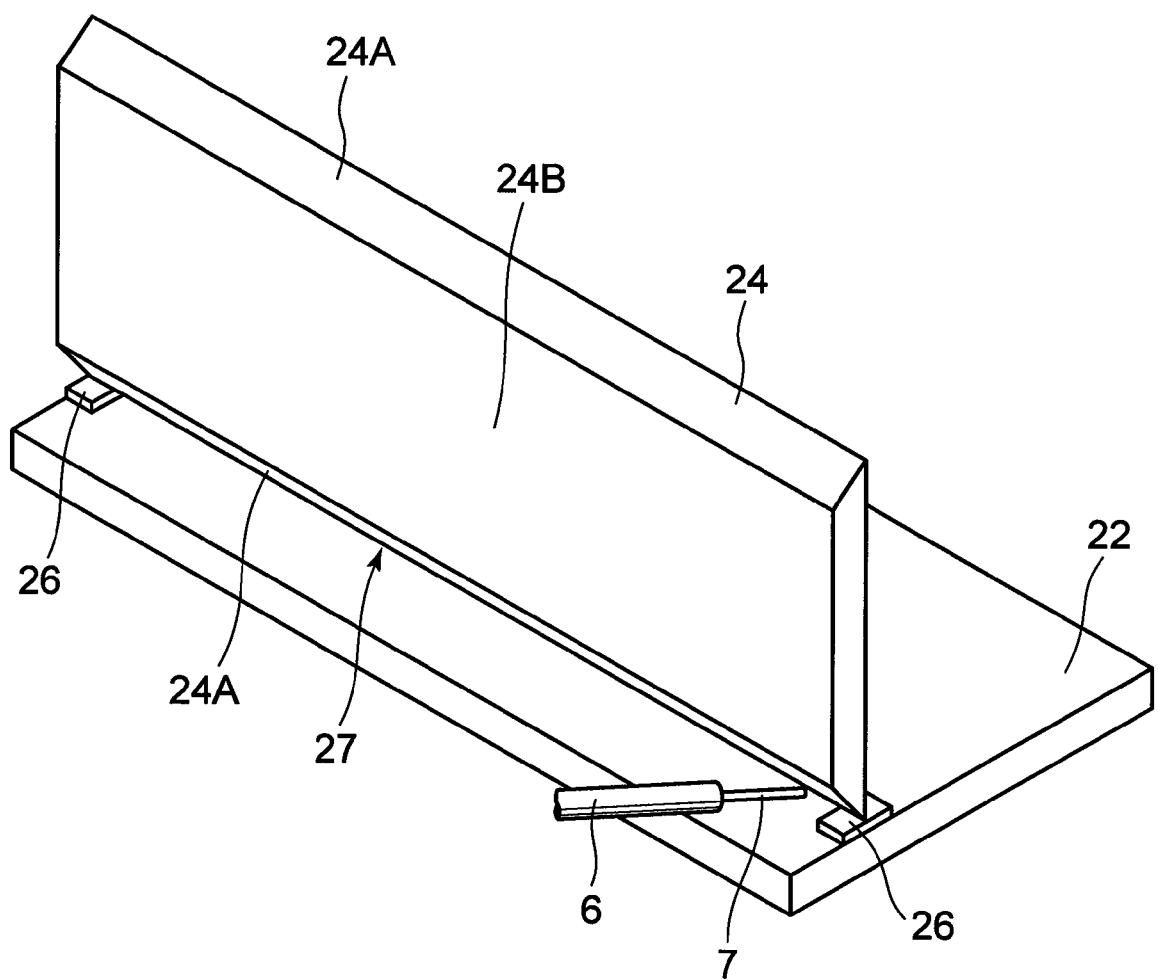
FIG. 12 is a perspective view illustrating a state in which one web plate is welded to one flange plate.

Further, in the case where this hollow structure 21 is formed, one flange plate, e.g., the lower flange plate 22, is prepared, as shown in FIG. 12. Next, one web plate, e.g., the left web plate 24, is assembled onto the lower flange plate 22 in a T-shape. In this case, a single-bevel groove 24A (hereafter referred to as the groove 24A) which is inclined diagonally is formed at each of the upper end side and the lower end side of the left web plate 24.

Then, the left web plate 24 is assembled in a T-shape to a position on the lower flange plate 22 offset toward one side in the left-right direction through a pair of thin plate-shaped spacers 26. In consequence, a gap 27 is formed between the lower flange plate 22 and the groove 24A of the left web plate 24 over the entire length thereof.

In this state, the welding torch 6 and the welding wire 7 are disposed on a front surface 24B side of the left web plate 24, and an arc is generated from the tip of the welding wire 7 while moving the welding torch 6 in the longitudinal direction of the left web plate 24. In consequence, in the same way as in the above-described first embodiment, a welding bead 28 consisting of the penetration bead, the first-layer welding bead and the second-layer welding bead can be formed between the lower flange plate 22 and the left web plate 24.

In consequence, by merely performing one side welding from the front surface 24B side of the left web plate 24, the welding bead 28 of a chevron shape can be formed between the groove 24A of the left web plate 24 and the flange plate 22, thereby making it possible to firmly join the left web plate 24 to the lower flange plate 22.

Figure 13:
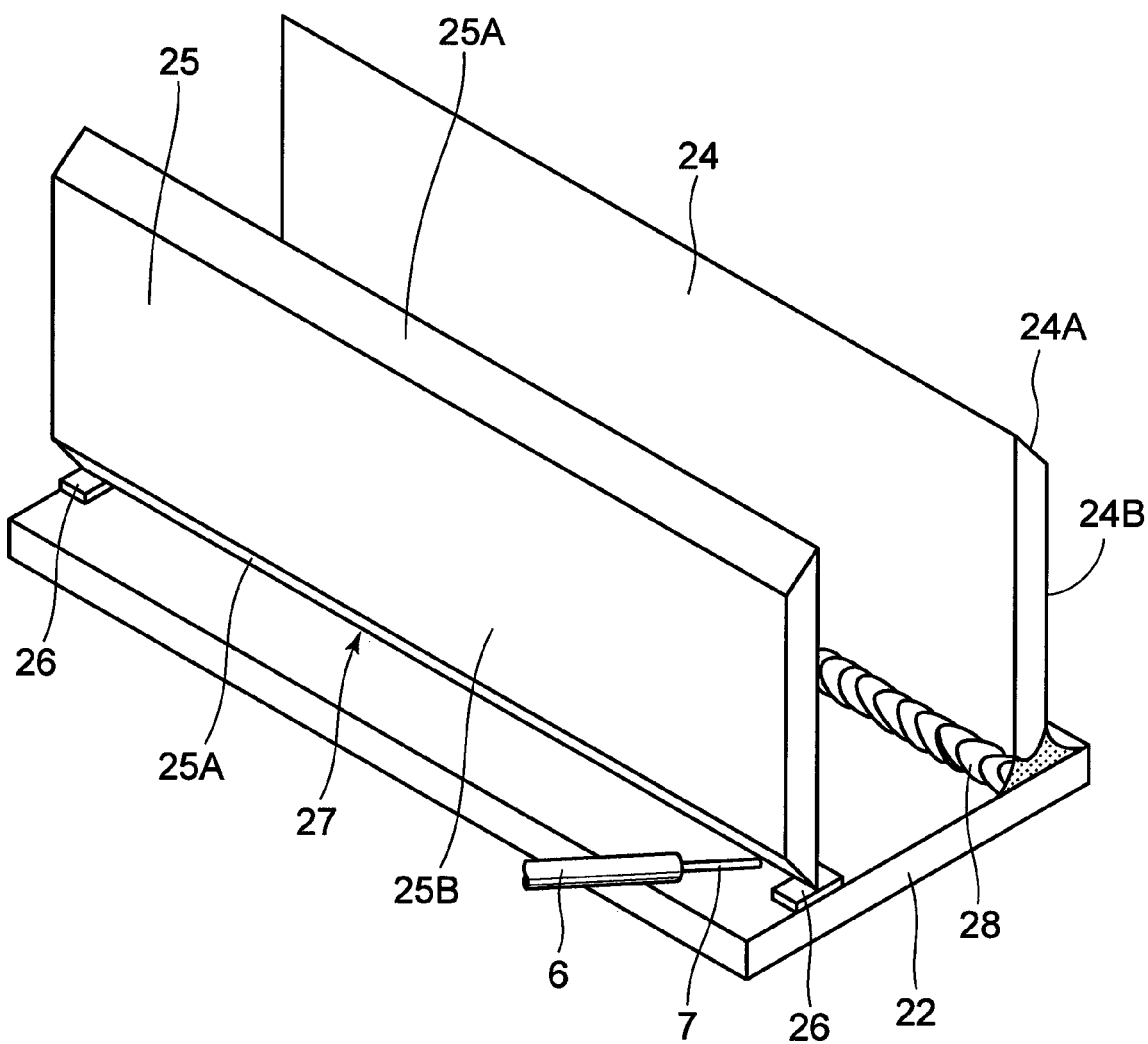
FIG. 13 is a perspective view illustrating a state in which another web plate is welded to the one flange plate.

Then, after the left web plate 24 is joined to the lower flange plate 22, the lower flange plate 22 is rotated 180 degrees in the horizontal direction, as shown in FIG. 13, for example. Further, the right web plate 25 is assembled to the top surface side of the lower flange plate 22 in a T-shape. In this case, a single-bevel groove 25A (hereafter referred to as the groove 25A) is formed at each of the upper end side and the lower end side of the right web plate 25 in the same way as in the left web plate 24.

Next, the right web plate 25 is assembled to the lower flange plate 22 in a T-shape at a position offset toward the other side in the left-right direction through a pair of spacers 26. In consequence, the gap 27 is formed between the lower flange plate 22 and the right web plate 25 over the entire length thereof. In this state, one side welding is performed from a front surface 25B side of the right web plate 25 by using the welding torch 6, thereby making it possible to form a welding bead 29 of a chevron shape between the right web plate 25 and the lower flange plate 22.

Figure 14:
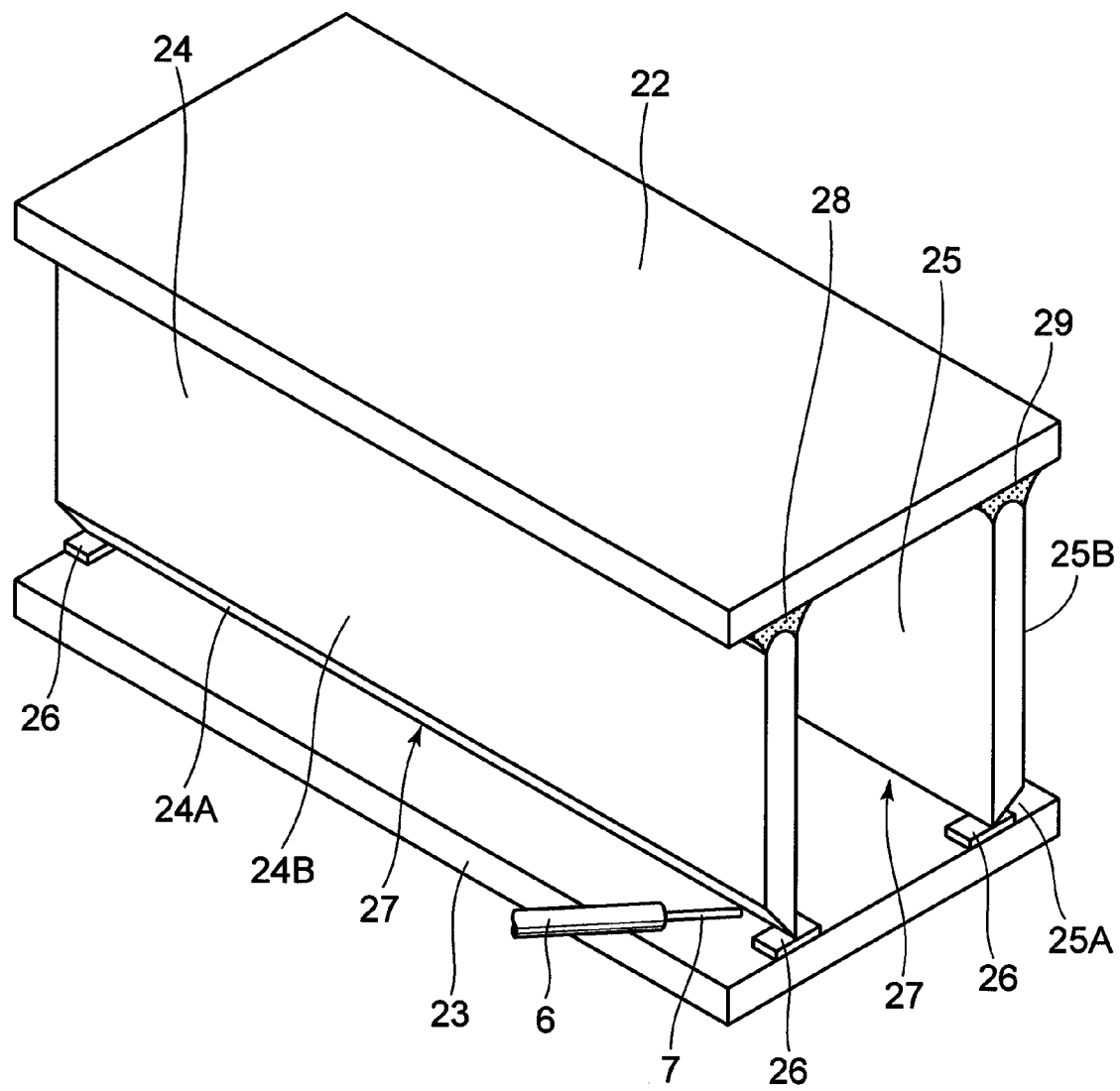
FIG. 14 is a perspective view illustrating a state in which the one web plate is welded to another flange plate.

Next, after the left and right web plates 24 and 25 are joined to the lower flange plate 22, the upper flange plate 23 is prepared, as shown in FIG. 14. Then, the grooves 24A and 25A of the left and right web plates 24 and 25 joined to the lower flange plate 22 are respectively assembled to the upper flange plate 23 through the spacers 26. The gaps 27 are respectively formed between the upper flange plate 23 and the groove 24A of the left web plate 24 and between the upper flange plate 23 and the groove 25A of the right web plate 25 over the entire length thereof.

In this state, one side welding is performed from the front surface 24B side of the left web plate 24 by using the welding torch 6. In consequence, a welding bead 30 of a chevron shape can be formed between the left web plate 24 and the upper flange plate 23, ranging from the front surface 24B side to the back surface side of the left web plate 24.

Figure 15:
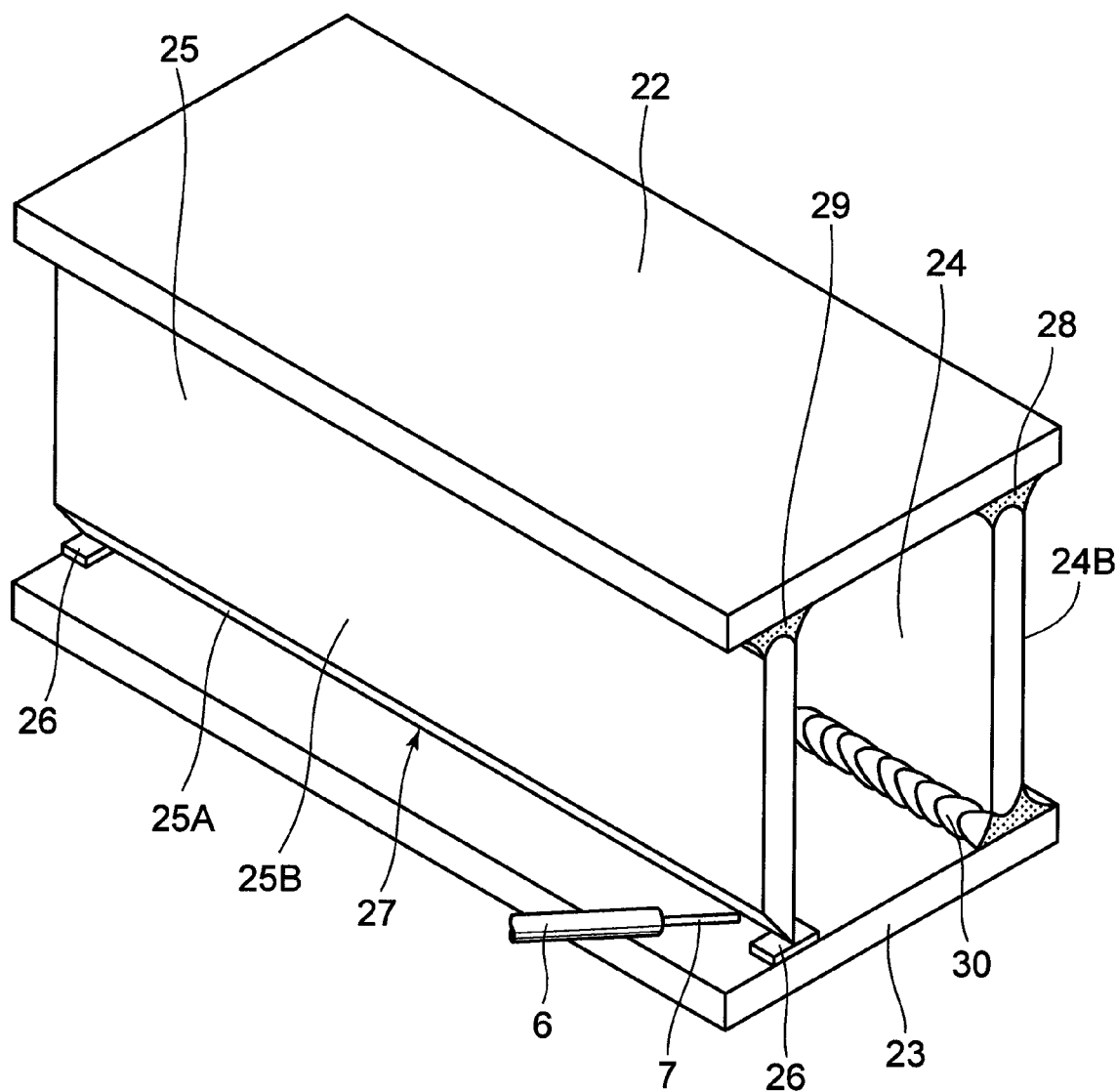
FIG. 15 is a perspective view illustrating a state in which the other web plate is welded to the other flange plate.

Further, as shown in FIG. 15, one side welding is performed from the front surface 25B side of the right web plate 25 by using the welding torch 6. In consequence, a welding bead 31 of a chevron shape can be formed between the right web plate 25 and the upper flange plate 23, ranging from the front surface 25B side to the back surface side of the right web plate 25.

Thus, according to the welding method for T-joint in accordance with the invention, in the case where the hollow structure 21 is formed which has a closed cross-sectional structure by the two flange plates 22 and 23 and the two web plates 24 and 25, it is unnecessary to execute a welding operation from the inner side of that hollow structure 21. Namely, by merely performing one side welding from the outer side of the hollow structure 21 (i.e., from the side of each of the front surfaces 24B and 25B of the web plates 24 and 25), it is possible to form the welding beads 28, 29, 30, and 31 having smooth chevron shapes at joint portions between the flange plates 22 and 23 and the web plates 24 and 25.

As a result, it is possible to enhance workability at the time of welding the two flange plates 22 and 23 and the two web plates 24 and 25 to each other to form the hollow structure 21. Therefore, a contribution can also be made to the reduction of the manufacturing cost of the hollow structure 21.

Moreover, it is unnecessary to provide fillet welding from the inner side of the hollow structure 21 to weld, for example, the lower flange plate 22 and the left web plate 24. Accordingly, it is unnecessary to provide operation holes for the welding operation in the lower flange plate 22 and the like. As a result, it is possible to suppress deterioration in the strength of the hollow structure 21 due to the provision of the operation holes, and enhance the reliability of the hollow structure 21. The same holds true of the case where the other flange plate and the other web plate are welded.

It should be noted that in the above-described embodiment the case of using the welding wire 7 is illustrated by way of example as the welding electrode (consumable electrode) for generating an arc toward the welding portion between the lower plate 1 and the groove 3 of the upright plate 2. However, the invention is not limited to the same, and a rod-like filler metal, for example, may be used as the welding electrode.

The invention claimed is:

1. A welding method for T-joint in which a lower plate and an upright plate disposed in a T-shape are welded, comprising:

a plate assembling step of assembling said upright plate to said lower plate in a T-shape in a state in which a gap is formed between a lower end portion of said upright plate and a top surface of said lower plate;

a first welding step of generating an arc from a welding electrode disposed on a front surface of said upright plate in a state in which said lower plate and said upright plate are assembled in the T-shape in said plate assembling step, so as to form a penetration bead on said lower plate while fusing said welding electrode and said lower plate and causing said gap to remain between a back surface of said upright plate and said lower plate; and a second welding step of generating an arc from said welding electrode disposed on said front surface side of said upright plate after said first welding step, to form a welding bead by fusing said welding electrode, said lower plate, said lower end portion of said upright plate, and said penetration bead, thereby joining said lower plate and said lower end portion of said upright plate.

2. The welding method for T-joint according to claim 1, further comprising:

a third welding step of generating, after said second welding step, an arc from said welding electrode toward a first-layer welding bead formed in said second welding step, so as to form a second-layer welding bead in addition to said first-layer welding bead by fusing said welding electrode, said first-layer welding bead, said lower plate, and said lower end portion of said upright plate.

3. The welding method for T-joint according to claim 1, wherein a consumable electrode is used as said welding electrode, and a dimension of said gap is set to be larger than an outside diameter of said consumable electrode.

4. The welding method for T-joint according to claim 1, wherein a groove is formed on said lower end portion of said upright plate, and in said first welding step said welding electrode is arranged to generate the arc in a vicinity of a position of a point of intersection between an imaginary line suspended from a leading end portion of said groove and said lower plate.

5. The welding method for T-joint according to claim 1, wherein said lower end portion of said upright plate is a flat surface having a flat bottom surface, and in said first welding step said welding electrode is arranged to generate the arc in a vicinity of a position of a point of intersection between an imaginary line suspended from said back surface of said upright plate and said lower plate in a state in which said flat surface is opposed to said lower plate.

6. The welding method for T-joint according to claim 1, wherein, in said second welding step, said welding electrode is arranged to generate the arc in a same direction as a generating direction of the arc in said first welding step.

7. The welding method for T-joint according to claim 1, wherein a mixed gas containing argon gas is used as a shielding gas for covering said arc.

* * * * *